US011936617B2

(12) United States Patent
Bleidorn et al.

(10) Patent No.: US 11,936,617 B2
(45) Date of Patent: Mar. 19, 2024

(54) SYSTEM AND METHOD OF APPLYING POLICY BASED, TARGETED PREFIX ADVERTISEMENTS VIA INTERNET PROTOCOL VERSION 6 (IPV6) STATELESS ADDRESS AUTO-CONFIGURATION (SLAAC) ROUTER ADVERTISEMENT (RA) POISONING

(71) Applicant: CHARTER COMMUNICATIONS OPERATING, LLC, St. Louis, MO (US)

(72) Inventors: Timothy C. Bleidorn, Colorado Springs, CO (US); Erez Jordan Gottlieb, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/121,187

(22) Filed: Mar. 14, 2023

(65) Prior Publication Data
US 2023/0216827 A1    Jul. 6, 2023

Related U.S. Application Data

(63) Continuation of application No. 17/726,227, filed on Apr. 21, 2022, now Pat. No. 11,695,729, which is a continuation of application No. 17/246,368, filed on Apr. 30, 2021, now Pat. No. 11,652,785.

(51) Int. Cl.
*H04L 61/5007* (2022.01)
*H04L 61/5038* (2022.01)
*H04L 61/5092* (2022.01)
*H04W 84/12* (2009.01)
*H04W 88/02* (2009.01)

(52) U.S. Cl.
CPC ...... *H04L 61/5007* (2022.05); *H04L 61/5038* (2022.05); *H04L 61/5092* (2022.05); *H04W 84/12* (2013.01); *H04W 88/02* (2013.01)

(58) Field of Classification Search
None
See application file for complete search history.

(56) References Cited

U.S. PATENT DOCUMENTS

10,659,940 B2 * 5/2020 Wang ................ H04W 60/06
10,813,032 B2 * 10/2020 Singh ................ H04L 67/125
11,196,588 B2 * 12/2021 Thubert ............. H04L 12/4633
(Continued)

*Primary Examiner* — Atta Khan
(74) *Attorney, Agent, or Firm* — THE MARBURY LAW GROUP, PLLC (57) ABSTRACT

Systems and network devices configured to use Stateless Address Auto-Configuration (SLAAC) to provide different internet protocol (IP) address information to user equipment (UE) devices that are connected to the same local area network (LAN). A network device (e.g., default router, etc.) may determine whether a UE device is eligible to receive special treatment based on a link-layer address of the UE device. The network device send the UE device an unicast router advertisement that includes a special prefix in response to determining that the UE device is eligible to receive special treatment. The network device may send the UE device an unicast router advertisement that includes a base prefix for the LAN in response to determining that the UE device is not eligible to receive special treatment.

20 Claims, 6 Drawing Sheets

(56) References Cited

U.S. PATENT DOCUMENTS

| | | | | |
|---|---|---|---|---|
| 2009/0024732 A1* | 1/2009 | Hirano | ............... | H04W 40/24 |
| | | | | 709/223 |
| 2019/0020617 A1* | 1/2019 | Truchan | ............... | H04W 8/26 |
| 2020/0382466 A1* | 12/2020 | Ly | ...................... | H04L 41/12 |

* cited by examiner

SYSTEM AND METHOD OF APPLYING POLICY BASED, TARGETED PREFIX ADVERTISEMENTS VIA INTERNET PROTOCOL VERSION 6 (IPV6) STATELESS ADDRESS AUTO-CONFIGURATION (SLAAC) ROUTER ADVERTISEMENT (RA) POISONING

RELATED APPLICATIONS

This application is a continuation of U.S. patent application Ser. No. 17/726,227 entitled "System and Method of Applying Policy Based, Targeted Prefix Advertisements via Internet Protocol Version 6 (IPv6) Stateless Address Auto-Configuration (SLAAC) Router Advertisement (RA) Poisoning" filed Apr. 21, 2022, which is a continuation of U.S. patent application Ser. No. 17/246,368 entitled "System and Method of Applying Policy Based, Targeted Prefix Advertisements via Internet Protocol Version 6 (IPv6) Stateless Address Auto-Configuration (SLAAC) Router Advertisement (RA) Poisoning" filed Apr. 30, 2021, the entire contents of all of which are hereby incorporated by reference for all purposes.

BACKGROUND

Many subscribers connect to the Internet via a customer premise device (CPE), which often includes a residential gateway (RG) and modem. The RG and modem may work together to provide network connectivity to home or small office network. In particular, the RG device (sometimes referred to as a "home router") allows user equipment (UE) devices to form a local area network (LAN). In addition, the modem provided with the RG in the CPE allows UE devices connected to the CPE to further connect to a network router and a wide area network (WAN), including the Internet.

SUMMARY

The various embodiments include methods of using Stateless Address Auto-Configuration (SLAAC) to provide different internet protocol (IP) address information to user equipment (UE) devices that may be connected to the same local area network (LAN), which may include determining whether a UE device is eligible to receive special treatment based on a link-layer address of the UE device, sending the UE device solicited and unsolicited unicast router advertisements that include a special prefix in response to determining that the UE device is eligible to receive special treatment based on the link-layer address, sending the UE device solicited and unsolicited unicast router advertisements that include a base prefix in response to determining that the UE device is not eligible to receive special treatment based on the link-layer address, and abrogating all multicast router advertisements.

Some embodiments may include sending the UE device an unsolicited unicast router advertisement that includes a poison base prefix, and sending the UE device an unsolicited unicast router advertisement that includes the special prefix in response to determining that the UE device is eligible to receive special treatment based on the link-layer address and after sending the UE device the unsolicited unicast router advertisement that includes the poison base prefix.

Some embodiments may include sending an unsolicited unicast router advertisement with the special prefix to the UE device in response to determining that the UE device is not eligible to receive special treatment based on the link-layer address and after sending the solicited unicast router advertisement that includes the base prefix, in which the unsolicited unicast router advertisement with the special prefix causes the UE device to store the special prefix in memory.

Some embodiments may include determining whether the UE device is eligible to receive special treatment based on other criteria in response to determining that the UE device is not eligible to receive special treatment based on the link-layer address, and sending the UE device an unsolicited unicast router advertisement that includes a poison base prefix in response to determining that the UE device is not eligible to receive special treatment based on the link-layer address or the other criteria, in which the unsolicited unicast router advertisement with the poison base prefix causes the UE device to delete its base prefix interface address and form a new interface address from the special prefix stored in memory.

Some embodiments may include determining whether the UE device is eligible to receive special treatment based on other criteria comprises determining whether the UE device is eligible to receive special treatment based on information received from a supplementary system.

In some embodiments, the UE device may be a mobile device. In some embodiments, determining whether a UE device is eligible to receive special treatment based on the link-layer address of the UE device may include a default router that may determine whether the UE device is eligible to receive special treatment based on the link-layer address of the UE device.

Further embodiments may include a computing device having a processor configured with processor-executable instructions to perform various operations corresponding to the methods discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments use Stateless Address Auto-Configuration (SLAAC) to provide different internet protocol (IP) address information to user equipment (UE) devices that are connected to the same local area network (LAN).

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Many subscribers connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet. A CPE may include LAN ports (e.g., ports FE0-FE3, etc.) and a LAN-interface for communicating with the various UE devices within the LAN. The CPE may include a WAN port (e.g., port FE4, etc.) and a WAN-interface that allows the UE devices connected to the UE device through the LAN to communicate with devices outside of the LAN.

The dynamic host configuration protocol (DHCP) is a network management protocol used on Internet Protocol version 4 (IPv4) networks whereby a DHCP server dynamically assigns an IP address and other network configuration parameters to each UE device on the LAN so they can communicate with other Internet Protocol (IP) networks on the WAN. A CPE may include a DHCP server that enables UE devices to request IP addresses and networking parameters automatically from the service provider, thereby reducing the need for a network administrator or a user to manually assign the IP addresses to the UE devices.

Internet Protocol version 6 (IPv6) is the most recent version of the Internet Protocol (IP), the communications protocol that provides an identification and location system for computers on networks, and routes traffic across the Internet. Most IPv6 capable devices support Stateless Address Auto-configuration (SLAAC), which is currently the preferred/most popular solution for disseminating interface address information to client devices.

SLAAC is a distributed address assignment process that enables network hosts to automatically configure their interfaces when connected to an IPv6 network. Typically, the assignment mechanism involves a host automatically generating an address for itself, verifying the uniqueness of the address, and assigning the address to one of the host's interfaces. As such, SLAAC allows hosts to generate and assign their own IPv6 addresses with minimal configuration of routers and without manual configuration or additional servers. In addition, SLAAC is ubiquitously supported by most current host operating systems and does not require centralized configuration servers for address assignment (which reduces network overhead).

The base level of intent and the normal posture in IPV6 is the inclusion and use of a routing advertisement server. A daemon typically handles router solicitations and responses to those router solicitations, as well as unsolicited router advertisements.

The default posture delivered in a IPV6 environment that supports Stateless Address Auto-Configuration (SLAAC) is that a routing advertisement may have a property of being unsolicited, but also answer to router solicitations from user equipment (UE) devices—regardless of the information in the router advertisement.

In order to provide UEs with the ability to address themselves, a prefix advertisement option within a router advertisement includes the prefix from which that UE creates its address space. The UE may create its address space using its MAC address, dynamically on an ongoing basis, using privacy extensions, etc.

There may be certain flags (e.g., an A bit, etc.) along with the prefix that instruct the UE whether or not it should form an address. As such, a system may advertise a prefix, but instruct the UE not to generate an address from that prefix. However, if the A bit is set, the UE will form an address.

In conventional solutions, there is generally no notion of a primary or secondary, and there may be variability in terms of the algorithm that the UE uses to decide which address to originate from if the UE is provided with multiple prefixes.

As such, at a base level, the solution provided by some embodiments is to instruct a UE to form an address from one prefix (e.g., a prefix that the system selects based on the policy server). If a UE is to receive special treatment, the system instructs the UE to form an address from the special prefix provided to it. If a non-special prefix (e.g., a default prefix) had previously been provided to the UE, then the system "poisons" that prefix.

Typically, until the system provides one UE on the network with a special prefix, the system may originate a default prefix and provide a combination of the responses to solicited router solicitations and unsolicited actions that are performed on a continuing basis (e.g., on some interval, etc.). The instant that the system provides a UE device with special treatment on the network, the system can no longer provide the unsolicited advertisements that have a default prefix in pure multicast form both at layer-2 and layer-3. With the A-bit set, the system may have targeted unsolicited advertisements. For unsolicited advertisements, particularly if the system is going perform recurring unsolicited advertisements, the system may target MAC address. While the system may leave it at layer-3, the system still uses a multicast address from a layer-3 perspective, but targets them and allows for sending to individual UEs by MAC address and/or to each of the UEs that are not provided with special treatment. The first and subsequent UEs that get the special treatment now receive targeted (either unsolicited or responses to solicited) advertisements that only have the special prefix. If the system knows that they previously had a non-special prefix, the system poisons the prefix (e.g., by setting lifetime to zero, etc.), which forces the UE to stop using that prefix.

Figure 1:
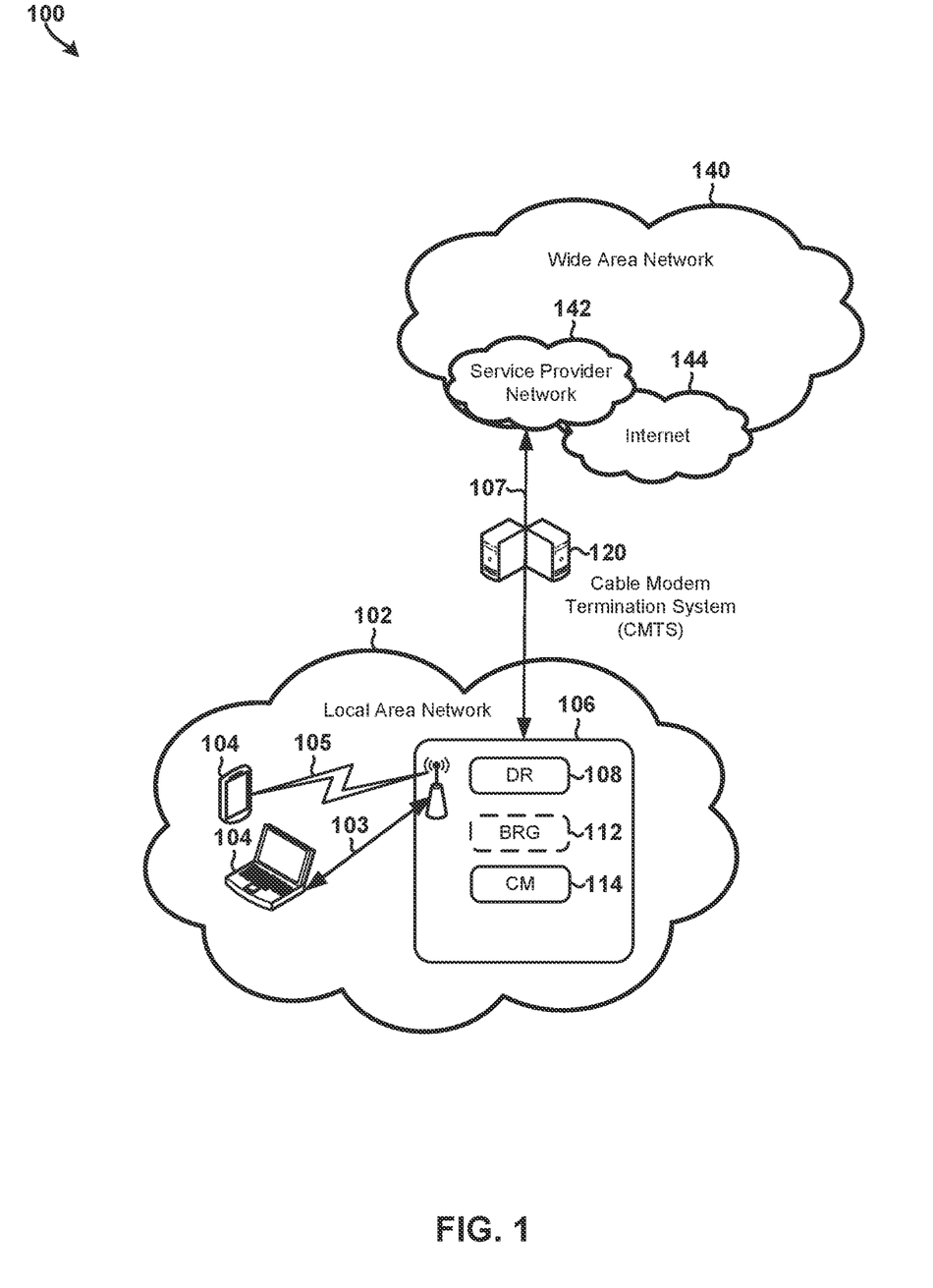
FIG. 1 is a block diagram of an example communication system that includes a local area network and is for use with various embodiments.

FIG. 1 is a simplified example of a network 100 that may be used to implement some embodiments. In the example illustrated in FIG. 1, the network 100 includes a local area network (LAN) 102 and a wide area network (WAN) 140. The LAN 102 includes user equipment (UE) 104 devices coupled to a customer premise equipment (CPE) 106 component/device via wired 103 and wireless 105 communication links. The CPE 106 may include a SLAAC default router (DR) 108, a bridged residential gateway (BRG) 112, and/or a cable modem (CM) 114. The CPE 106 may include communication links 107 through a digital subscriber line access multiplexer (DSLAM) or a cable modem termination system (CMTS) 120 to a service provider network 142 within the WAN 140. The communication links 107 may allow the UE 104 devices to send and receive information to and from the Internet 144.

Generally, IPv4 addressing for a home LAN 102 is handled by stateful DHCP services from a router, which makes selection of individual addressing trivial. With IPv6 there are several methods available to a client to assign an address to one or more interfaces, such as Stateful DHCPv6 and SLAAC (no DHCP server is used).

The DR 108 may be configured to disseminate IP or interface address information to the UE 104 devices (when using SLAAC). In conventional solutions, the DR 108 advertises a single prefix onto the LAN 102 for all the UE 104 devices, and thus all of the UE 104 devices within the LAN 102 use the same prefix information to form a SLAAC address. The UE 104 devices may use the SLACC address to source IPv6 packets for off-LAN communications.

SLAAC does not have any explicit mechanisms to differentiate or delineate the assignment of prefix information or individual IPv6 interface addressing assignment. The principle problem presented with the universal support of SLAAC addressing is that there exists no simple and effective way to provide distinct prefixes based on client identity. That is to say that differing SLAAC prefix information cannot be selectively transmitted to clients in an efficient way. Some embodiments may allow devices to provide differentiated SLAAC information based on policy within a default router.

The CM 114 may be a network bridge that provides bi-directional data communication via radio frequency channels on a hybrid fiber-coaxial (HFC) and/or radio frequency over glass (RFoG) infrastructure. The CMTS 120 component may be deployed in a headend or hubsite, and configured to facilitate high speed communications between the CM 114 and the components within the service provider network 142.

In some embodiments, the functions of the CPE 106 may be distributed between the BRG 112 and a broadband network gateway (BNG) in the service provider network 142. The BNG component may be configured to facilitate communications with the CPE 106 component, such as by creating a logical subscriber link (LSL) between the BRG 112 component and a virtual gateway component in the service provider network 142.

As discussed above, when using SLAAC, the DR 108 typically advertises a single prefix onto the LAN 102 for all the UE 104 devices, and all of the UE 104 devices in the LAN 102 use the same SLACC prefix. As a result, devices outside the LAN 102 (e.g., routers in the service provider network 142, etc.) cannot readily use addresses formed via the SLACC process to differentiate between different UE 104 devices within the same LAN 102. This inability to differentiate between UE 104 devices may prevent the service/network providers from implementing certain features and controls at the DOCSIS layer, such as features that provide special treatment (e.g., prioritize IP traffic, etc.) to certain UE 104 devices (e.g., a parent's laptop) and not to others (e.g., a child's tablet, television, etc.).

The embodiments described herein overcome the above described limitations of SLAAC to allow service/network providers to differentiate between different UE 104 devices within the same LAN 102 so that service/network providers may implement certain features and controls at the DOCSIS layer, such as giving special treatment (e.g., prioritizing IP traffic, etc.) to certain UE 104 devices in the LAN 102 and not others.

In order to affect this special treatment, the DOCSIS layer may require a characteristic contained in the information of a flow of data that could be used to identify the flow as requiring further attention. The current architecture to provide an appropriate characteristic to the DOCSIS layer is a layer 3 IPv6 prefix assigned (Native and Post MAP-T) to the home/LAN and used by approved UE 104 devices for the purposes of interface addressing. The DOCSIS layer may determine the appropriate level of service for a specific flow of data based on the IPv6 prefix of the UE 104 device.

Some embodiments may include a GW component configured to determine or detect that a client (e.g., UE 104) exists in the event that the client receives a multicast unsolicited RA and forms an address. In some embodiments, when the client forms an address, it will send a duplicate address detection (DAD) multicast message out on the network. The GW component may detect the DAD message, and determine that the client exists based on the layer 2 address in the DAD message. In some embodiments, if the client connects to the network and does not send an RS (very rare corner case), it may still form a link-local address and also send a DAD message. This provides another avenue to detect a client.

Figure 2:
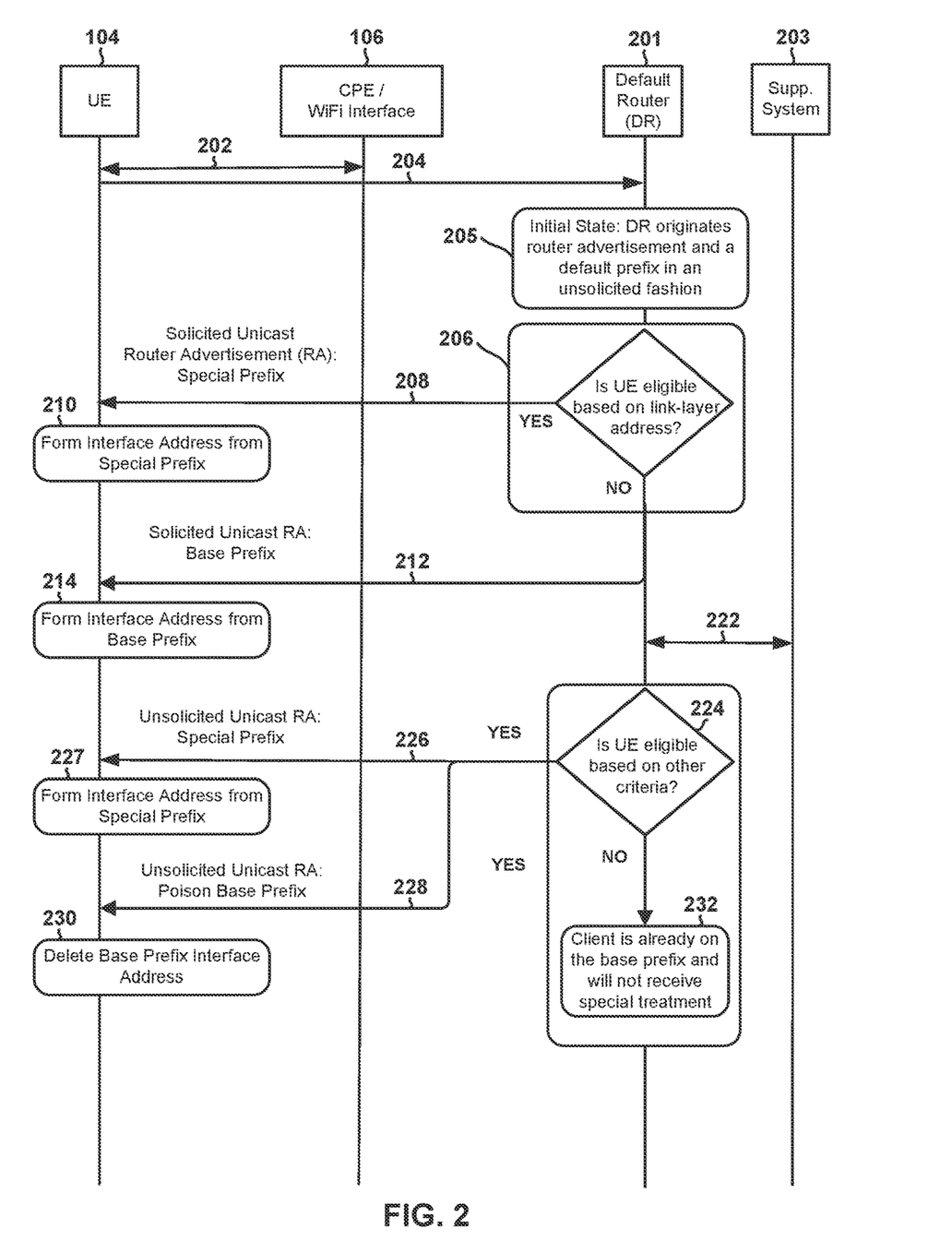
FIG. 2 is an activity diagram that illustrates the components, interactions, and operations in a system configured to use Stateless Address Auto-Configuration (SLAAC) to provide different internet protocol (IP) address information to UE devices that are connected to the same local area network (LAN) in accordance with various embodiments.

FIG. 2A illustrates a method 200 for modifying SLAAC so as to allow service/network providers to differentiate between different UE 104 devices within the same LAN in accordance with some embodiments. All or portions of methods 200 may be performed by a processor of a UE 104 device, a wireless access point, wireless router or CPE 106, a default router (DR) 201, and/or a supplemental system 203. In some embodiments, all or portions of method 200 may be performed by a processor in a computing system that implements all or portions of a router, CPE, or UE component.

The supplemental system 203 may be an ancillary policy system configured to make eligibility determinations and prefix selection. In various embodiments, the operations or functions of the supplemental system 203 may be embedded as part of the logic within the DR 201 or as a separate entity with signaling to the DR 201.

In operation 202, the UE 104 device may associate with the CPE 106 (or Wi-Fi interface, wireless access point, wireless router, etc.) of the router, and performs Wi-Fi protocol authentication and authorization operation for access to the LAN. After establishing a successful connection in operation 202 between the UE 104 device and CPE 106, the UE 104 device may generate an Internet Control Message Protocol (ICMP) type 133 Router Solicitation (RS) in operation 204 to elicit a Router Advertisement (RA) from the DR 201. The UE 104 may populate the Source Link Layer Address Field with its Ethernet Media Access Control (MAC) address per RFC 4861.

In operation block 205, the DR 201 may operate in its initial state in which the DR 201 originates a router advertisement with a default prefix in an unsolicited fashion. At this point, it is possible for the UE 104 to form an address via that prefix. The DR 201 may also send out a solicited advertisement (e.g., a multicast listener discovery (MLD) message, etc.), which is a way of detecting that a device has come onto the network and for the system to determine the device's MAC address.

In operation block 206, the DR 201 may determine whether the UE 104 device is eligible to receive special treatment based on its link layer address.

In some embodiments, the DR 201 may include a database table of all link layer values to which special consideration should be provided. The table may list link layer addresses and associated prefix information (created and maintained by an administrator or an automated process) for the purposes of instructing the DR 201 in the selection of prefix values to be used in the Router Solicitation (RS) message response to the UE 104 device. The DR 201 may include or maintain any number of distinct prefix information sets in the database table. For example, in some embodiments, the DR 201 may include or maintain a base prefix information set in the database table, which may be used for all clients/UEs with which no match may be made between the received source link layer address option and an entry in the table. The DR 201 may also include or maintain a conditional prefix information set in the database table, which may be used for clients/UEs with which a match can be made between the received source link layer address option and an entry in the table.

Accordingly, upon receipt of the Router Solicitation (RS) message from the UE 104 device via the LAN (e.g., operation 204), in operation block 206 the DR 201 may extract the link layer address (MAC address) from the source link layer option and generate RS response message with the appropriate prefix set information. For example, the DR 201 may generate and send a RS response message with the base prefix for the LAN in response to determining that the value of the source link layer address option present in the RS messages does not match an entry in the table. The DR 201 may generate and send a RS response message with the conditional prefix associated with the table entry in response to determining that the value of the source link layer address option present in the RS message does match a value held in the table.

In response to determining that the UE 104 device is eligible based on the link-layer address (i.e., determination block 206="YES"), in operation 208, the DR 201 may instruct the system to stop sending out unsolicited advertisements to linked layer multicast address. Also in operation 208, the DR 201 may generate and send a solicited unicast router advertisement (RA) that includes the special or conditional prefix information, such as a prefix information set that denotes a speed-boosted client in operation 208. In operation block 210, the UE 104 may receive and use the solicited unicast RA that includes the special (conditional) prefix information to form an interface address from the special (conditional) prefix.

In response to determining that the UE 104 device is not eligible based on the link-layer address (i.e., determination block 206="NO"), the DR 201 may generate and send a solicited unicast router advertisement (RA) that includes the base prefix information in block 212. In operation block 214, the UE 104 may receive and use the solicited unicast RA that includes the base prefix information to form an interface address from the base prefix.

With the introduction of randomized MAC addresses, the link layer source address of the UE 104 device may change over time. This may cause the state information in the link layer address table held by the DR 201 to expire over time, as the UE 104 device cycles through randomized link layer addresses. As a conditional policy measure, if there is no table match upon receipt of the client RS message, in operation 222, the DR 201 may request information from the supplemental system 203 (ancillary policy system). The supplemental system 203 may have access to more detailed client identity services, which may allow the DR 201 to better determine UE 104 device's eligibility for special treatment with respect to prefix information set.

The supplemental system 203 may respond to the DR's 202 information request in operation 222 via either a positive response or a negative response. A positive response may indicate that the client does warrant special (conditional) treatment by the DR. Similarly, a negative response may indicate that the UE 104 device does not warrant special (conditional) treatment by the DR 201.

In some embodiments, supplemental system 203 may include in its response to the DR's 202 information request all of the associated link layer addresses known to the policy system for the UE 104 device. The DR 201 may receive and use this information to remove any stale table entries from the client link layer or prefix table.

In some embodiments, supplemental system 203 may include in its response to the DR's 202 information request a "type of service" string. The DR 201 receive and use this information to determine the prefix information set to apply to the link layer address.

The supplemental system 203 response sent in operation 222 may include either all of the prefix set information or a pointer value. For example, in some embodiments, the response may include all prefix set information with which the DR 201 will form a new table entry. In some embodiments, the DR 201 may maintain a table of prefix information and associated pointer value coordinated with the policy system, and the response may include a pointer value that is understood by the DR 201 which will conduct a subsequent lookup of the appropriate prefix set information. In the former case (i.e., response with all of the prefix set information), the policy system may be the authoritative repository of all prefix information. In the latter case (i.e., response with pointer) the DR 201 may be the authoritative repository for all prefix information.

In determination block 224, the DR 201 may determine whether the UE 104 device is eligible to receive special treatment based on other criteria (e.g., information received from the supplemental system 203, etc.).

In response to receiving a positive response from the supplemental system 203 or otherwise determining that the UE 104 device warrants special (conditional) treatment by the DR 201 (e.g., the determination block 224="Yes"), in operation 226 the DR 201 may generate and send an unsolicited unicast router advertisement (RA) with a special prefix to the UE 104 device. In block 227, the UE 103 may form an interface address from the special prefix.

Alternatively or in addition, in operation 228, the DR 201 may generate and send an unsolicited unicast router advertisement (RA) with a poison base prefix (e.g., an unsolicited ICMP type 134 RA with the value of the Router Lifetime option set to 0) to the UE 102 device. The unsolicited unicast RA with the poison base prefix may instruct the UE 104 device to depreciate the DR 201 and all prefix information associated with the DR 201.

In response to receiving a negative response from the supplemental system 203 or otherwise determining that the UE 104 device does not warrant special (conditional) treatment by the DR 201 (e.g., the determination block 224="No"), in operation block 232 the DR 201 may end the processor as the client is already on the base prefix and will not receive special treatment.

In operation block 230, the UE 104 device may receive and use the unsolicited unicast router advertisement (RA) with a poison base prefix to delete base prefix interface address or all prefix information associated with the DR 201. In some embodiments, the UE 104 may also depreciate the DR 201 or remove the DR 201 from its lists.

Figure 3:
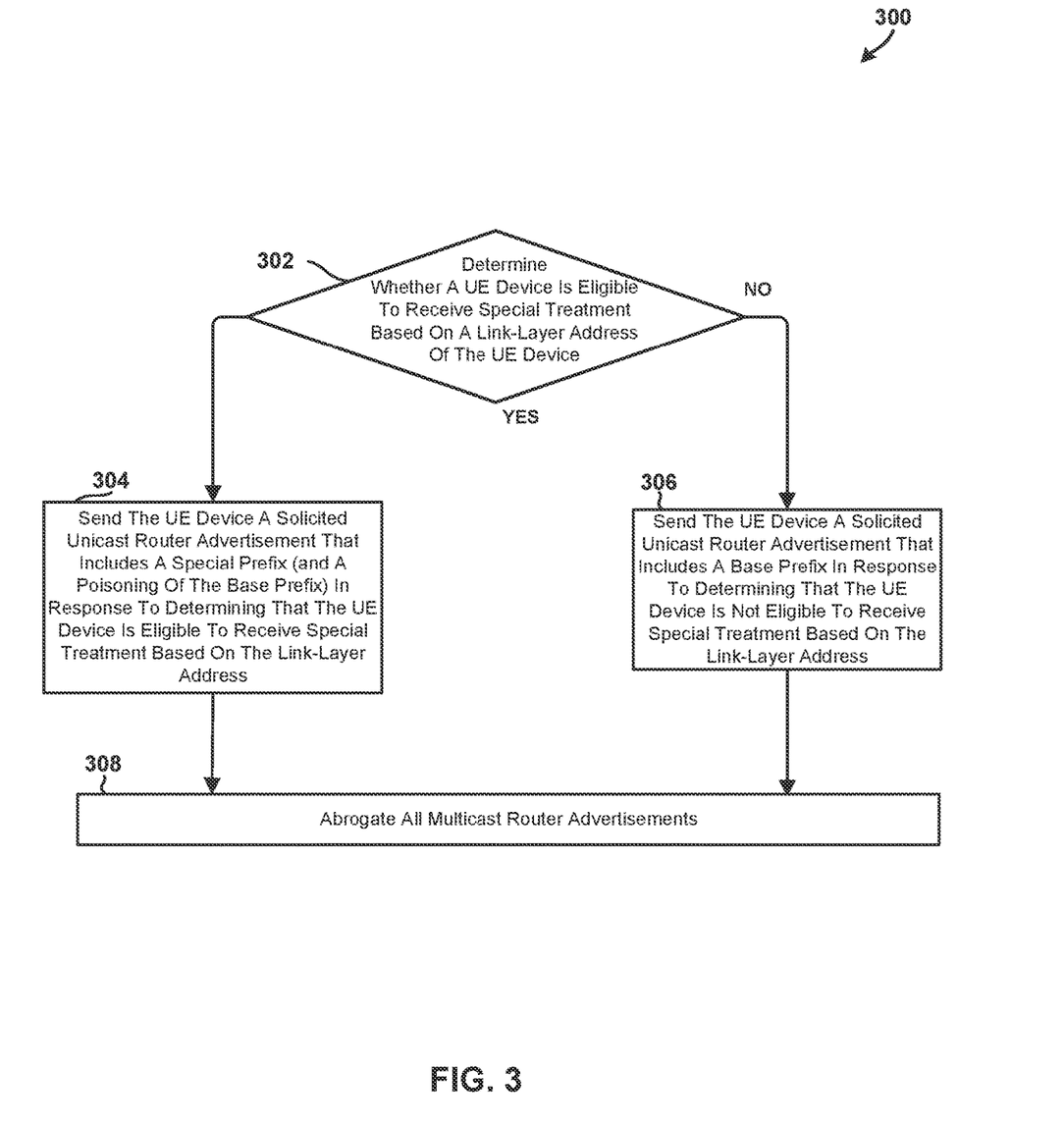
FIG. 3 is a process flow diagram that illustrates a method of using SLAAC to provide different IP address information to UE devices that are connected to the same LAN in accordance with various embodiments.

FIG. 3A illustrates a method 300 of using Stateless Address Auto-Configuration (SLAAC) to provide different internet protocol (IP) address information to user equipment (UE) devices that are connected to the same local area network (LAN) in accordance with some embodiments. Methods 300, 320, 350 may be performed by one or more processors in a computing device that implements all or portions of a default router (e.g., DR 201 illustrated in FIGS. 2A and 2B).

In block 302 of method 300, the DR processor may determine whether a UE device is eligible to receive special treatment based on a link-layer address of the UE device. In block 304, the DR processor may send the UE device a solicited unicast router advertisement that includes a special prefix in response to determining that the UE device is eligible to receive special treatment based on the link-layer address. In block 306, the DR processor may send the UE device a solicited unicast router advertisement that includes a base prefix in response to determining that the UE device is not eligible to receive special treatment based on the link-layer address.

In block 308, the DR processor may abrogate all multicast advertisements.

In some embodiments, the DR processor may determine whether the UE device is eligible to receive special treatment based on other criteria in response to determining that the UE device is not eligible to receive special treatment based on the link-layer address.

In some embodiments, the DR processor may send the UE device an unsolicited unicast router advertisement that includes a poison special prefix in response to determining that the UE device is not eligible to receive special treatment based on the link-layer address or the other criteria.

In some embodiments, the DR processor may send the UE device an unsolicited unicast router advertisement that includes the special prefix in response to determining that the UE device is not eligible to receive special treatment based on the link-layer address or the other criteria and after sending the UE device the unsolicited unicast router advertisement that includes the poison base prefix.

In some embodiments, the DR processor may send an unsolicited unicast router advertisement with the special prefix to the UE device in response to determining that the UE device is not eligible to receive special treatment based on the link-layer address and after sending the solicited unicast router advertisement that includes the base prefix. The unsolicited unicast router advertisement may cause the UE device to store the special prefix in memory.

In some embodiments, the DR processor may determine whether the UE device is eligible to receive special treatment based on other criteria (e.g., information received from a supplemental system, etc.) in response to determining that the UE device is not eligible to receive special treatment based on the link-layer address.

In some embodiments, the DR processor may send the UE device an unsolicited unicast router advertisement that includes a poison base prefix in response to determining that the UE device is not eligible to receive special treatment based on the link-layer address or the other criteria. The unsolicited unicast router advertisement with the poison base prefix may cause the UE device to delete its base prefix interface address and form a new interface address from the special prefix stored in memory.

Figure 4:
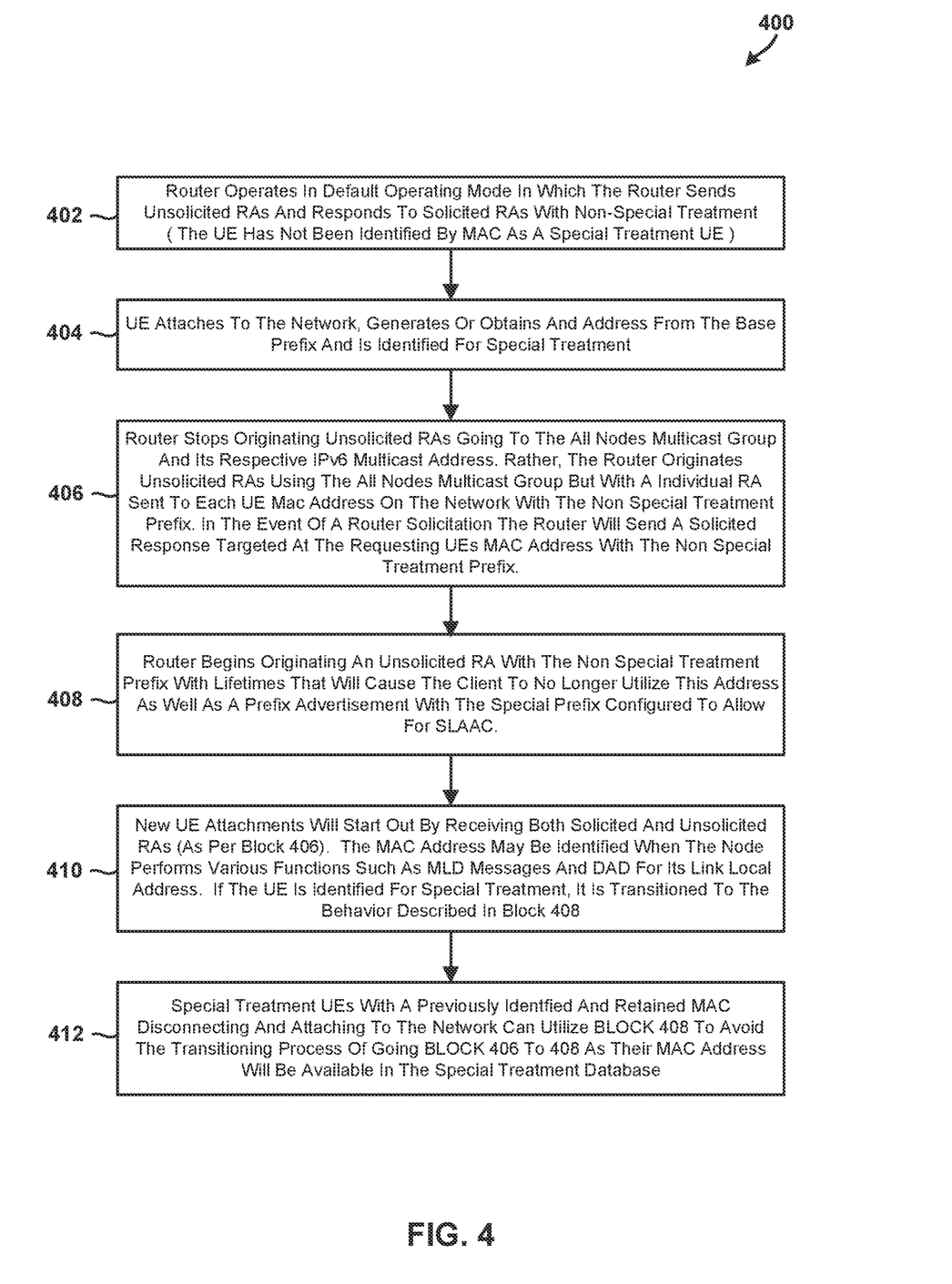
FIG. 4 is process flow diagram that illustrates another method of using SLAAC to provide different IP address information to UE devices that are connected to the same LAN in accordance with some embodiments.

FIG. 4 illustrates a method 400 of using Stateless Address Auto-Configuration (SLAAC) to provide different internet protocol (IP) address information to user equipment (UE) devices that are connected to the same local area network (LAN) in accordance with an embodiment. Method 400 may be performed by one or more processors in on or more computing devices (e.g., UE 104, DR 201, etc.).

With reference to FIGS. 1-4, in block 402, the DR 201 may commence operating in a default operating mode in which the DR 201 sends unsolicited RAs and responds to solicited RAs with the non-special treatment. It is assumed that at this point a UE 104 has not been identified by MAC as a special treatment UE 104.

In block 404, the UE 104 may attach to the network, generate or obtain an address from the base prefix, and may be identified for special treatment.

In block 406, the DR 201 may stop originating unsolicited RAs going to the all nodes multicast group and its respective IPv6 multicast address. Instead, the DR 201 may commence originating unsolicited RAs using the all nodes multicast group but with an individual RA sent to each UE link layer address (MAC address) on the network with the non-special treatment prefix. In the event of a router solicitation, the DR 201 may send a solicited response targeted at the requesting UE's link layer address (MAC address) with the non-special treatment prefix.

After the operations in block 406, any existing UE attached that is identified for special treatment will not get the RAs from the DR 201. Instead, in block 408, the DR 201 begins originating an unsolicited RA with the non-special treatment prefix with lifetimes that will cause the client to no longer utilize this address as well as a prefix advertisement with the special prefix configured to allow for SLAAC.

After the operations in blocks 406 and 408, any new UE attachment will start out by receiving both solicited and unsolicited RAs. In block 410, the DR 201 may identify link layer addresses (MAC addresses) when the node performs various functions, such as multicast listener discovery (MLD) messages and duplicate address detection (DAD) for its link local address. That is, before binding to a link local address, the UE may join the multicast group (via MLD) of its solicited node multicast address, thereby allowing for observing the MAC address before the router solicitation. If the UE is identified for special treatment, it may be transitioned to the behavior described in block 408.

In block 412, special treatment UEs with a previously identified and retained link layer addresses (MAC addresses) disconnecting and attaching to the network may utilize the operations in block 408 to avoid the transitioning process in block 406 as their MAC address will be available in the special treatment database.

When there are no special treatment UEs present on the network the DR 201 may transition back to the default operating mode in block 402, and perform the operations in block 406-410 to support the special treatment posture.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 250, 300, 320 and 350 may be substituted for or combined with one or more operations of the methods 200, 250, 300, 320 and 350, and vice versa.

Some various embodiments (including, but not limited to, embodiments discussed above with reference to FIGS. 1-5) may be implemented in any of a variety of UE computing devices, an example of which is illustrated in FIG. 5. For example, the computing device 500 may include a processor 501 coupled to a controller 504 and an internal memory 502. The processor 501 may be one or more multicore integrated circuits (ICs) designated for general or specific processing tasks. The internal memory 502 may be volatile or non-volatile memory, and may also be secure and/or encrypted memory, or unsecure and/or unencrypted memory, or any combination thereof.

Figure 5:
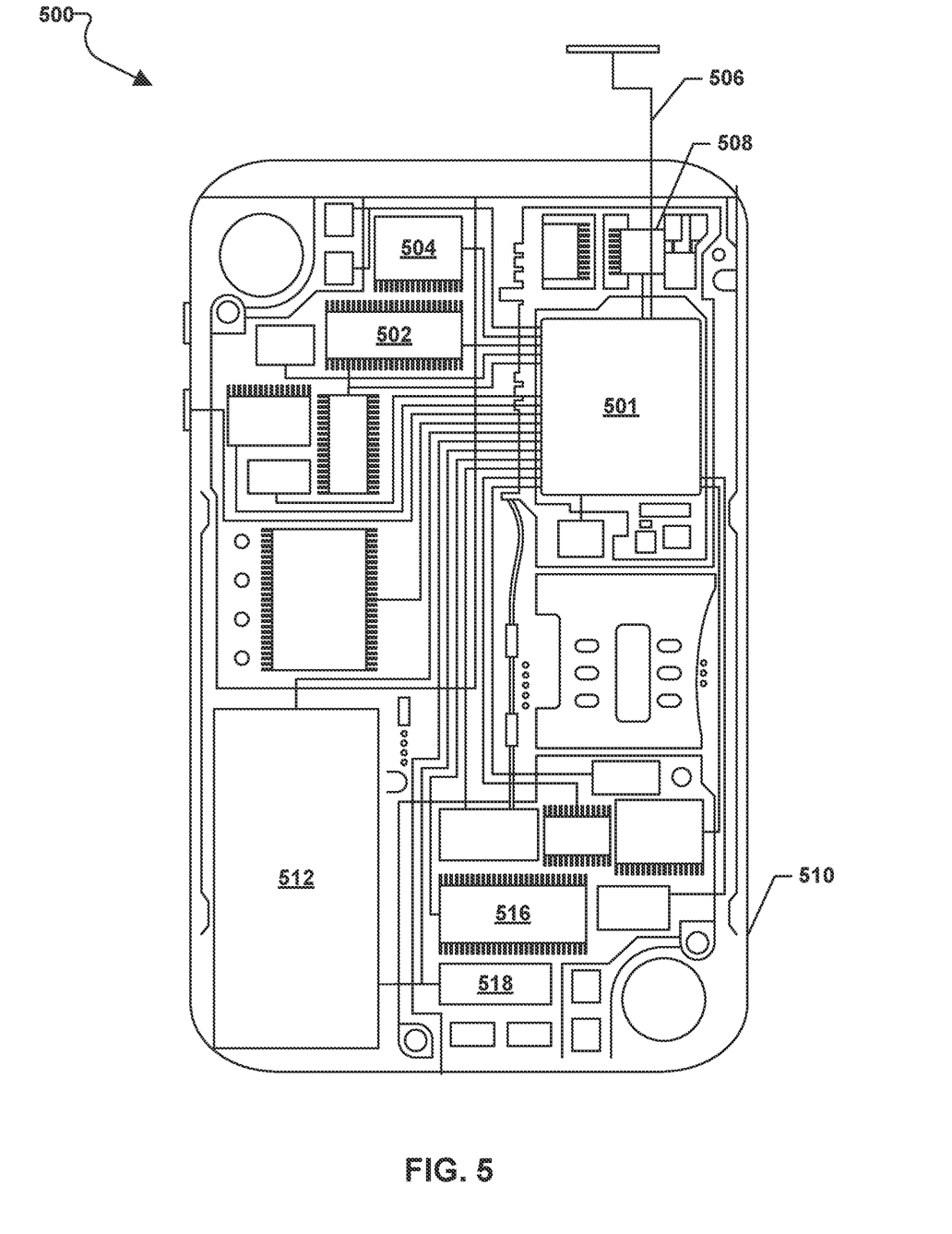
FIG. 5 is a block diagram of a communication device suitable for implementing any of the embodiments.

The computing device 500 may have one or more radio signal transceivers 508 (e.g., Peanut®, Bluetooth®, Zig-Bee®, Wi-Fi, cellular, etc.) and antennae 506, for sending and receiving, coupled to each other and/or to the processor 501. The transceivers 508 and antennae 506 may be used with the above-mentioned circuitry to implement the various wireless transmission protocol stacks and interfaces. The computing device 500 may include a cellular network wireless modem chip 516 that enables communication via a cellular network and is coupled to the processor.

The computing device 500 may include a peripheral device connection interface 518 coupled to the processor 501. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown).

The computing device 500 may also include a housing 510, constructed of a plastic, metal, or a combination of materials, for containing all or some of the components discussed herein. The computing device 500 may include a power source 512 coupled to the processor 501, such as a disposable or rechargeable battery. The rechargeable battery may also be coupled to the peripheral device connection port to receive a charging current from a source external to the computing device 500.

Figure 6:
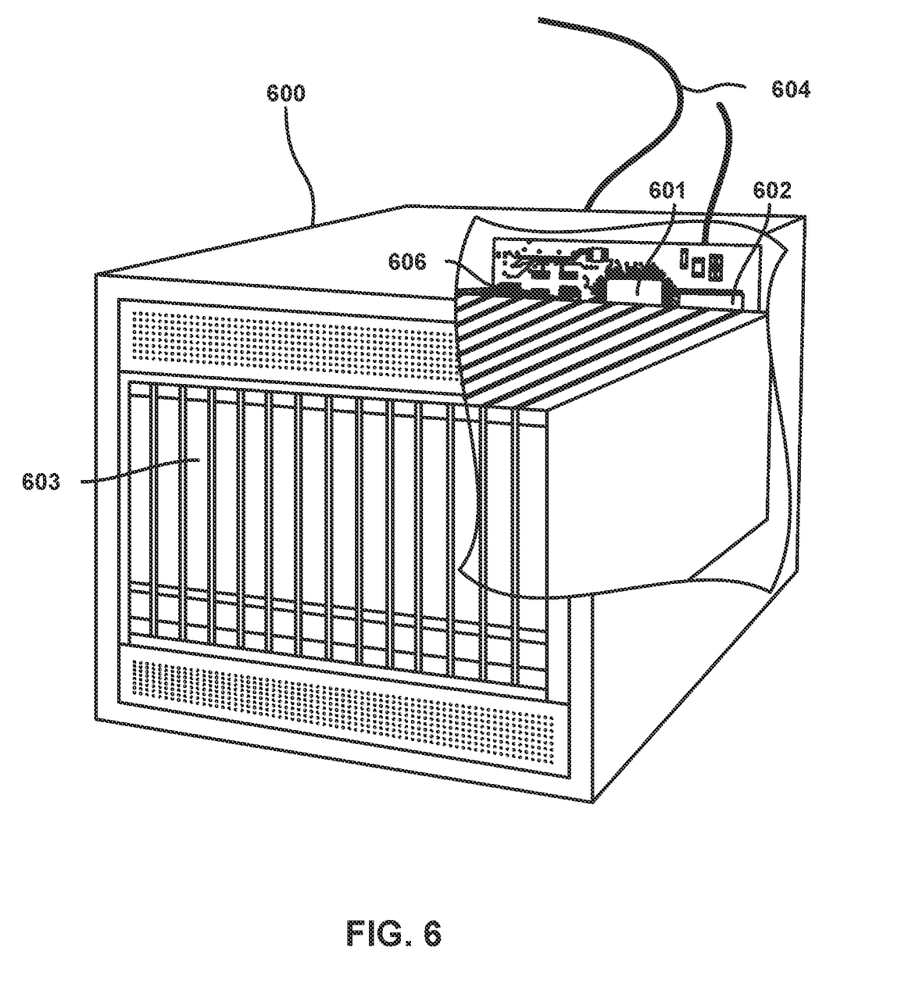
FIG. 6 is a component diagram of an example server suitable for implementing the various embodiments.

Some embodiments may be implemented on any of a variety of commercially available computing devices, such as the server computing device 600 illustrated in FIG. 6. Such a server device 600 may include a processor 601 coupled to volatile memory 602 and a large capacity non-volatile memory, such as a disk drive 603. The server device 600 may also include a floppy disc drive, USB, compact disc (CD) or DVD disc drive coupled to the processor 601. The server device 600 may also include network access ports 606 coupled to the processor 601 for establishing data connections with a network connection circuit 604 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing different internet protocol (IP) address information to user equipment (UE) devices that are connected to the same local area network (LAN), the method comprising:
 operating a default router (DR) in a default operating mode in which the DR sends unsolicited Router Advertisements (RAs) and responds to solicited RAs with non-special treatment;
 ceasing sending unsolicited RAs and commencing sending an individual RA with a non-special treatment prefix to each UE link layer address on the network in response to determining that a UE device attached to the network and generated or obtained a base prefix address;
 sending an unsolicited RA with a special treatment prefix to allow for Stateless Address Autoconfiguration (SLAAC); and
 transitioning back to the default operating mode in response to determining that there are no special treatment UEs present on the network.

2. The method of claim 1, wherein ceasing sending unsolicited RAs and commencing sending the individual RA with the non-special treatment prefix to each UE link layer address on the network in response to determining that the UE attached to the network and generated or obtained the base prefix address comprises:

ceasing sending unsolicited RAs and commencing sending the individual RA with the non-special treatment prefix to each UE media access control address (MAC address) on the network in response to determining that the UE attached to the network and generated or obtained the base prefix address.

3. The method of claim 1, further comprising identifying one or more of the UE link layer addresses in response to receiving a multicast listener discovery (MLD) message or a duplicate address detection (DAD) from one or more UE devices.

4. The method of claim 1, further comprising observing a link layer address of a UE device before sending a router solicitation (RS).

5. The method of claim 1, wherein sending the unsolicited RA with the special treatment prefix comprises sending the unsolicited RA with a prefix advertisement.

6. The method of claim 1, further comprising sending unsolicited RAs with lifetimes that cause a UE device to no longer utilize the non-special treatment prefix.

7. The method of claim 1, further comprising originating the unsolicited RAs using an all nodes multicast group.

8. A computing device, comprising:
a processor configured to provide different internet protocol (IP) address information to user equipment (UE) devices that are connected to the same local area network (LAN) by:
operating a default router (DR) in a default operating mode in which the DR sends unsolicited Router Advertisements (RAs) and responds to solicited RAs with non-special treatment;
ceasing sending unsolicited RAs and commencing sending an individual RA with a non-special treatment prefix to each UE link layer address on the network in response to determining that a UE device attached to the network and generated or obtained a base prefix address;
sending an unsolicited RA with a special treatment prefix to allow for Stateless Address Autoconfiguration (SLAAC); and
transitioning back to the default operating mode in response to determining that there are no special treatment UEs present on the network.

9. The computing device of claim 8, wherein the processor is configured to cease sending unsolicited RAs and commence sending the individual RA with the non-special treatment prefix to each UE link layer address on the network in response to determining that the UE attached to the network and generated or obtained the base prefix address by:
ceasing sending unsolicited RAs and commencing sending the individual RA with the non-special treatment prefix to each UE media access control address (MAC address) on the network in response to determining that the UE attached to the network and generated or obtained the base prefix address.

10. The computing device of claim 8, wherein the processor is further configured to identify one or more of the UE link layer addresses in response to receiving a multicast listener discovery (MLD) message or a duplicate address detection (DAD) from one or more UE devices.

11. The computing device of claim 8, wherein the processor is further configured to observe a link layer address of a UE device before sending a router solicitation (RS).

12. The computing device of claim 8, wherein the processor is configured to send the unsolicited RA with the special treatment prefix by sending the unsolicited RA with a prefix advertisement.

13. The computing device of claim 8, wherein the processor is further configured to send unsolicited RAs with lifetimes that cause a UE device to no longer utilize the non-special treatment prefix.

14. The computing device of claim 8, wherein the processor is further configured to originate the unsolicited RAs using an all nodes multicast group.

15. A non-transitory computer readable storage medium having stored thereon processor-executable software instructions configured to cause a processor to perform operations for providing different internet protocol (IP) address information to user equipment (UE) devices that are connected to the same local area network (LAN), the operations comprising:
operating a default router (DR) in a default operating mode in which the DR sends unsolicited Router Advertisements (RAs) and responds to solicited RAs with non-special treatment;
ceasing sending unsolicited RAs and commencing sending an individual RA with a non-special treatment prefix to each UE link layer address on the network in response to determining that a UE device attached to the network and generated or obtained a base prefix address;
sending an unsolicited RA with a special treatment prefix to allow for Stateless Address Autoconfiguration (SLAAC); and
transitioning back to the default operating mode in response to determining that there are no special treatment UEs present on the network.

16. The non-transitory computer readable storage medium of claim 15, wherein the processor is configured with processor-executable instructions to perform operations such that ceasing sending unsolicited RAs and commencing sending the individual RA with the non-special treatment prefix to each UE link layer address on the network in response to determining that the UE attached to the network and generated or obtained the base prefix address comprises:
ceasing sending unsolicited RAs and commencing sending the individual RA with the non-special treatment prefix to each UE media access control address (MAC address) on the network in response to determining that the UE attached to the network and generated or obtained the base prefix address.

17. The non-transitory computer readable storage medium of claim 15, wherein the processor is configured with processor-executable instructions to perform operations further comprising identifying one or more of the UE link layer addresses in response to receiving a multicast listener discovery (MLD) message or a duplicate address detection (DAD) from one or more UE devices.

18. The non-transitory computer readable storage medium of claim 15, wherein the processor is configured with processor-executable instructions to perform operations such that sending the unsolicited RA with the special treatment prefix comprises sending the unsolicited RA with a prefix advertisement.

19. The non-transitory computer readable storage medium of claim 15, wherein the processor is configured with processor-executable instructions to perform operations further comprising sending unsolicited RAs with lifetimes that cause a UE device to no longer utilize the non-special treatment prefix.

20. The non-transitory computer readable storage medium of claim 15, wherein the processor is configured with processor-executable instructions to perform operations further comprising originating the unsolicited RAs using an all nodes multicast group.

\* \* \* \* \*